United States Patent [19]
Hayden et al.

[11] Patent Number: 5,345,567
[45] Date of Patent: Sep. 6, 1994

[54] SYSTEM AND METHOD FOR MODIFYING PROGRAM STATUS WORD SYSTEM MASK, SYSTEM ACCESS KEY, AND ADDRESS SPACE CODE WITH OVERLAP ENABLED

[75] Inventors: Clifford O. Hayden, Jamaica Plain, Mass.; David R. Snyder, Poughkeepsie, N.Y.; Susan B. Stillman, Poughkeepsie, N.Y.; Charles F. Webb, Poughkeepsie, N.Y.

[73] Assignee: International Business Machines Corporation, Armonk, N.Y.

[21] Appl. No.: 712,285

[22] Filed: Jun. 10, 1991

[51] Int. Cl.$^5$ .............................. G06F 9/312
[52] U.S. Cl. .................. 395/375; 364/DIG 1; 364/247.3; 364/261; 364/261.2; 364/946.7; 364/933.61; 395/775
[58] Field of Search ............ 395/700, 375, 775

[56] References Cited

U.S. PATENT DOCUMENTS

| | | | |
|---|---|---|---|
| 4,400,769 | 8/1983 | Kaneda et al. | 395/650 |
| 4,581,702 | 4/1986 | Saroka et al. | 764/DIG. 1 |
| 4,901,233 | 2/1990 | Liptay | 364/200 |
| 4,987,537 | 1/1991 | Kawata | 364/DIG. 1 |
| 5,003,468 | 3/1991 | Watanabe et al. | 364/DIG. 1 |

OTHER PUBLICATIONS

Capozzi et al. "Non-Sequential High-Performance Processing," *IBM Technical Disclosure Bulletin*, Oct. 1984, vol. 27, No. 5, pp. 2842-2844.

*Enterprise Systems Architecture/390: Principles of Operation* (IBM Publication No. SA22-7201-00).

*Primary Examiner*—Eddie P. Chan
*Attorney, Agent, or Firm*—Sterne, Kessler, Goldstein & Fox

[57] ABSTRACT

A system and method for modifying program status words (PSW) with overlap enabled. According to the present invention, an instruction which modifies a PSW system mask, access key, or address space code is executed with overlap enabled. This instruction generates a new PSW. The new PSW is pushed into a queue. Once the instruction is complete, the new PSW becomes an architected PSW. If the instruction does not complete, then the new PSW is discarded. Once the new PSW is pushed into the queue, subsequent instructions may execute using the new PSW. Thus, instructions which modify the PSW system mask, access key, and address space code may execute with overlap enabled.

21 Claims, 4 Drawing Sheets

SYSTEM AND METHOD FOR MODIFYING PROGRAM STATUS WORD SYSTEM MASK, SYSTEM ACCESS KEY, AND ADDRESS SPACE CODE WITH OVERLAP ENABLED

DESCRIPTION

The present invention is directed to systems and methods for modifying program status words (PSW) with overlap enabled. In particular, the present invention is directed to systems and methods for modifying a PSW system mask, access key, and address space code with overlap enabled.

TECHNICAL FIELD

The present invention relates generally to systems and methods for modifying program status words (PSW) with overlap enabled.

BACKGROUND ART

The International Business Machines Corporation (IBM) ESA/390 architecture defines a program status word (PSW) which includes a system mask, an access key, and an address space control. ESA stands for Enterprise Systems Architecture.

Ordinarily, the instructions which modify the PSW system mask, access key, and address space control are executed with overlap disabled. Executing such instructions with overlap enabled could result in violations of the computer systems' architectures. However, executing such instructions with overlap disabled significantly degrades the performance of the computer systems.

In a pending patent application entitled "Overlapped Serialization" (Ser. No. 07/641,987; filed Jan. 16, 1991), an invention is described for processing instructions with overlap enabled which are required by the ESA/390 architecture to be serialized. This class of instructions includes ones which update PSW fields. However, this invention does not describe or suggest a system or method for modifying the PSW with overlap enabled. In "Non-sequential High-Performance Processing" (*IBM Technical Disclosure Bulletin*, October 1984), an invention for pre-analyzing interdependencies and maximizing parallel execution of instructions in order to reduce processor execution delays is described. However, this invention does not describe or suggest a system or method for storing non-architected PSW values. Further, this invention does not describe or suggest a system or method for modifying the PSW with overlap enabled.

Thus, a system and method for modifying the PSW with overlap enabled are required.

DOCUMENTS INCORPORATED BY REFERENCE

Pending patent application entitled "Overlapped Serialization" (Serial No. 07/641,987; Filed: Jan. 16, 1991; Assignee: IBM Corporation) now U.S. Pat. No. 5,257,354 is incorporated by reference herein, in its entirety, as if printed in full below.

*Enterprise Systems Architecture/3.9.0.: Principles of Operation* (Publication Number SA22-7201-00) is incorporated by reference herein, in its entirety, as if printed in full below.

SUMMARY OF THE INVENTION

The present invention represents a computer system having one or more processors, wherein each of the processors includes a PSW having a system mask, an access key, and an address space code. Each processor also includes a decoder for detecting instructions which modify the PSW and a completion/interrupt control for detecting when the instructions are complete. Each processor further includes execution units, such as an address calculation element (ACE) and a system execution element (SXE).

Each execution unit includes a register for storing an architected PSW and a queue for storing unarchitected PSWs.

According to the present invention, an instruction which modifies the PSW (particularly an instruction which modifies the PSW system mask, access key, and address space code) is executed with overlap enabled. This instruction generates a new PSW.

The new PSW is pushed into the queue. Once the instruction is complete, the new PSW in the queue is transferred to the register. Thus, the new PSW becomes the architected PSW.

If the instruction does not complete, then the new PSW is discarded from the queue.

Once the new PSW is pushed into the queue, subsequent instructions may execute using the new PSW. Thus, instructions which modify the PSW may execute with overlap enabled.

The foregoing and other objects, features and advantages of the invention will be apparent from the following more particular description of preferred embodiments of the invention, as illustrated in the accompanying drawings. In the drawings, like reference numbers indicate identical or functionally similar elements.

BRIEF DESCRIPTION OF DRAWINGS

The present invention will be described with reference to the accompanying drawings, where.

BEST MODE FOR CARRYING OUT THE INVENTION

1.0. Program Status Word Overview

Program status words (PSW) are well known to those skilled in the art. For illustrative purposes, selected PSW features are reviewed in this section.

The IBM ESA/390 architecture defines a PSW which includes a system mask, access key, address space code, condition code, program mask, and various flags.

The system mask includes an input/output (I/O) interrupt mask and an external interrupt mask for identifying enabled asynchronous interrupts.

The access key is used for memory protection. In the IBM ESA/390 architecture, memory is divided into blocks. A protection bit is associated with each block. If a block's protection bit equals zero, then that block may be accessed notwithstanding the value of the access key.

If a block's protection bit does not equal zero, then that block is protected. If the protected block contains operands, then the protected block is said to be storage protected. If the protected block contains instructions, then the protected block is said to be fetch protected. Access to the protected block is determined by the access key, as described below.

The access key determines the blocks which may be accessed. If the access key is 0, then all blocks may be accessed notwithstanding the values of the blocks' protection bits. If the access key is not zero, then only those blocks whose protection bits are equal to the access key may be accessed. For example, if the access key equals 2, then only those blocks whose protection bits equal 2 may be accessed.

The address space code defines the mode in which memory is accessed for instruction fetches and for operand fetches and stores. In a preferred embodiment of the present invention, four modes are defined for fetching instructions: primary, secondary, access register, and home. At any time, the address space code is set to one of these modes. While in the primary, secondary, or access register mode, instructions are fetched from a primary space in memory. While in the home mode, instructions are fetched from a home space in memory.

In the present invention, a Store Then Or System Mask (STOSM) instruction and a Store Then And System Mask (STNSM) instruction are used to modify the PSW system mask. A Set PSW Key From Address (SPKA) instruction is used to modify the PSW access key. A Set Address Control (SAC) instruction is used to modify the PSW address space code.

As noted above, the present invention is directed to a system and method for modifying the PSW with overlap enabled. In particular, the present invention is directed to a system and method for modifying the PSW system mask, access key, and address space code (using the STOSM, STNSM, SPKA, and SAC instructions, respectively) with overlap enabled. Based on the discussion contained herein, it should be obvious to those with ordinary skill in the art to extend the present invention such that other aspects of the PSW may be modified with overlap enabled.

2.0. Overview of the Present Invention

Figure 1:
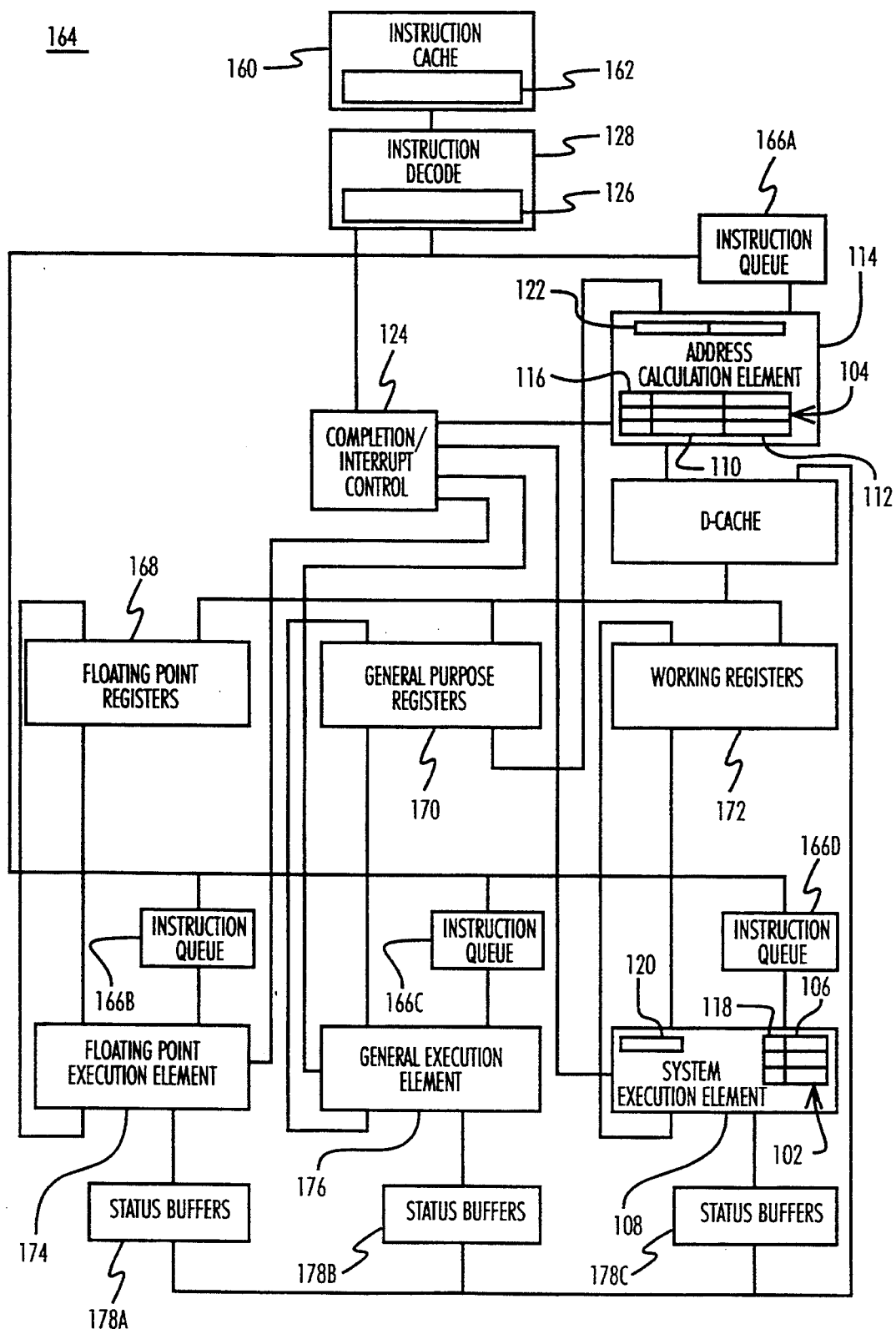
FIG. 1 illustrates a processor of a preferred embodiment of the present invention.

FIG. 1 illustrates a processor 164 of a preferred embodiment of the present invention. The processor 164 is located in a computer system. In the preferred embodiment of the present invention, the computer system operates according to an International Business Machines Corporation (IBM) ESA/390 architecture. ESA stands for Enterprise Systems Architecture.

The processor 164 includes a floating point execution unit (FXE) 174 which is coupled to a set of floating point registers (FPRs) 168, a general purpose execution unit (GXE) 176 which is coupled to a set of general purpose registers 170, working registers 172, instruction queues 166, and store (or result) buffers 178 (A-C).

The processor 164 also includes an instruction decode (I-decode) 128 and an instruction cache (I-cache) 160. The I-decode 128 and I-cache 160 contain an I-decode control 126 and an I-cache control 162, respectively.

The processor 164 further includes a system execution element (SXE) 108, an address calculation element (ACE) 114, and a completion/interrupt control 124.

The general structure and operation of the above elements are well known to those skilled in the art. The specific structural and operational features of the above elements required to achieve the present invention are described below.

The SXE 108 manages the PSW system mask. The SXE 108 includes a PSW system mask register 120 which stores an architected PSW system mask. The architected PSW system mask represents the current, confirmed PSW system mask value.

The SXE 108 also includes a system mask queue 102 for storing overlapped PSW system mask updates. Each element of the system mask queue 102 contains a system mask value 106 and a tag 118.

According to the present invention, STOSM and STNSM instructions which modify only the I/O interrupt mask and/or the external interrupt mask of the PSW system mask may be executed with overlapped enabled. The manner in which the present invention processes STOSM and STNSM instructions with overlap enabled is briefly described below.

When a STOSM or STNSM instruction creates a new system mask value, the new system mask value is associated with an instruction identification (IID) of the STOSM or STNSM instruction. Then, the new system mask value and IID are pushed into the top of the system mask queue 102 (specifically, the new system mask value and IID are pushed into the system mask value 106 and tag 118 fields, respectively).

The new system mask value and IID remain in the system mask queue 102 until the associated STOSM or STNSM instruction completes. Once the associated STOSM or STNSM instruction completes, the new system mask value is saved as the architected PSW system mask in the PSW system mask register 120. If the associated STOSM or STNSM instruction does not complete, then the new system mask value in the system mask queue 102 is discarded.

Once the new system mask value is pushed into the system mask queue 102, instructions which begin operation after the associated STOSM or STNSM instruction (including other STOSM and STNSM instructions) execute using the new system mask value. Therefore, STOSM and STNSM instructions which modify only the I/O interrupt mask and external interrupt mask of the PSW system mask may executed with overlapped enabled. Note that asynchronous interrupts are enabled only from the architected PSW system mask.

The ACE 114 manages the PSW access key and address space code. The ACE 114 includes a PSW key/address space register 122 which stores an architected PSW access key and address space code. The architected PSW access key and address space code represents the current, confirmed PSW access key and address space code.

The ACE 114 also includes a key/address space queue 104 for storing overlapped PSW access key and address space code updates. Each element of the key/address space queue 104 contains an access key value 110, an address space code value 112, and a tag 116.

According to the present invention, SPKA and SAC instructions which modify the PSW access key and address space code, respectively, may be executed with overlap enabled. The manner in which the present invention processes SPKA and SAC instructions with overlap enabled is briefly described below.

When a SPKA or SAC instruction creates a new access key or address space code value, the new access key or address space code value is associated with an instruction identification (IID) of the SPKA or SAC instruction. Then, the new access key or address space code value and the IID are pushed into the key/address space queue 104. Specifically, the new access key or address space code value is pushed into the access key value 110 or address space code value 112 field. The IID is pushed into the tag 116 field.

The new access key or address space code value and the IID remain in the key/address space queue 104 until the associated SPKA or SAC instruction completes. Once the associated SPKA or SAC instruction completes, the new access key or address space code value is saved as the architected PSW access key or address space code in the PSW key/address space register 122. If the associated SPKA or SAC instruction does not complete (due to an interrupt or incorrect branch prediction, for example), then the new access key or address space code value in the key/address space queue 104 is discarded.

Once the new access key or address space code value is pushed into the key/address space queue 104, instructions which begin operation after the associated SPKA or SAC instruction (including additional SPKA and SAC instructions) may execute using the new access key or address space code. Since all operand fetch and store requests are generated by the ACE 114, and since the ACE 114 processes instructions in the order they are decoded, this mechanism allows SPKA and SAC instructions to be overlapped with other instructions while ensuring that each instruction's operand accesses are made using the proper key and address space code.

The operation of the present invention is described in greater detail in the following sections.

3.0. SXE

Figure 2:
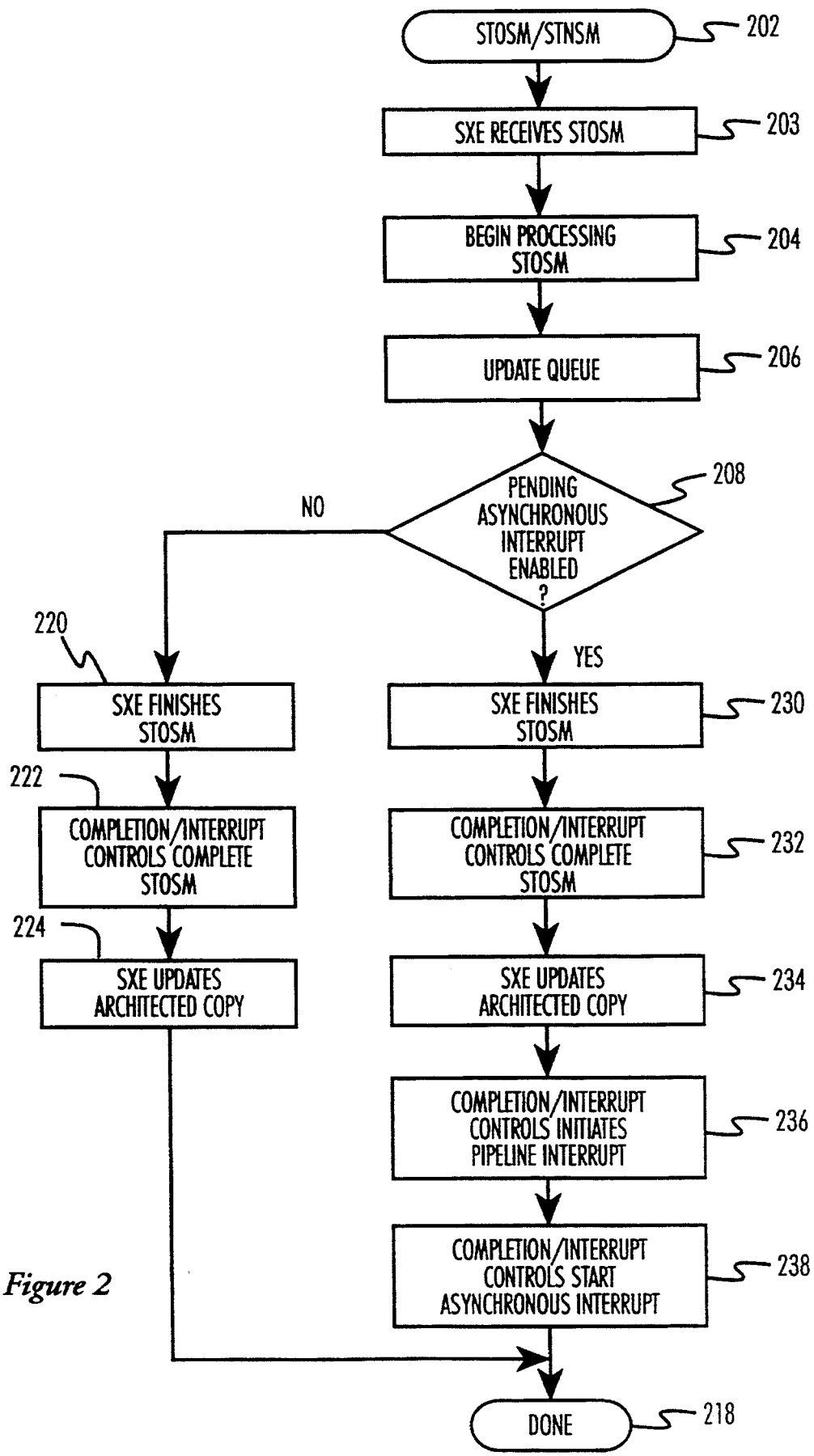
FIG. 2 illustrates the manner in which the present invention processes STOSM and STNSM instructions with overlap enabled.

FIG. 2 illustrates the manner in which the present invention processes STOSM and STNSM instructions with overlap enabled. For brevity purposes, FIG. 2 is described below with regard to the STOSM instruction only. However, the following discussion is equally applicable to the STNSM instruction.

In step 203, the SXE 108 receives a STOSM instruction from the I-decode 128 (via the instruction queue 166A). As noted above, if the STOSM instruction modifies only the I/O interrupt mask and/or the external interrupt mask, then the STOSM instruction may execute with overlap enabled. The I-decode control 126 determines whether the STOSM instruction modifies only the I/O interrupt mask and/or the external interrupt mask and enables or disables overlap accordingly. The following discussion assumes that overlap is enabled.

In step 204, the SXE 108 begins to process the STOSM instruction. During step 204, the SXE 108 generates a new PSW system mask value. The manner in which the SXE 108 generates the new PSW system mask value is well known.

In step 206, the SXE 108 associates the new PSW system mask value with an instruction identification (IID) of the STOSM instruction. Then, the SXE 108 pushes the new PSW system mask value and the IID into the top of the system mask queue 102.

Note that the STOSM instruction, in generating the new PSW system mask value, may have enabled a pending asynchronous interrupt. According to a preferred system architecture of the processor 164, a pending asynchronous interrupt which is enabled by a STOSM instruction must be executed directly after the STOSM instruction. That is, no other instructions may be completed between the completion of the STOSM instruction and the processing of the asynchronous interrupt.

Thus, in step 208, the SXE 108 determines whether the STOSM instruction enabled a pending asynchronous interrupt. The mechanism for this is well known in the art.

If a pending asynchronous interrupt is not enabled, then in step 220 the SXE 108 reports that the STOSM is finished.

In step 222 the finished report from the SXE 108 is monitored by the completion/interrupt control 124. When the STOSM is finished and all prior instructions have been completed, the completion/interrupt control 124 reports the STOSM completed.

In step 224 the completion report from the completion/interrupt control 124 is monitored by the SXE 108. When the STOSM is completed, the SXE 108 updates the PSW mask register 120 with the updated system mask value. Thus, the new system mask value becomes the architected PSW system mask.

If a pending asynchronous interrupt is enabled by the new system mask value, then in step 230 the SXE 108 reports that the STOSM is finished and that it requires a pipeline interrupt to prevent subsequent instructions from being completed.

In step 232 the finished report from the SXE 108 is monitored by the completion/interrupt control 124. When the STOSM is finished and all prior instructions have been completed, the completion/interrupt control 124 reports that the STOSM completed.

In step 234 the completion report from the completion/interrupt control 124 is monitored by the SXE 108. When the STOSM is completed, the SXE 108 updates the PSW mask register 120 with the updated system mask value. Thus, the new system mask value becomes the architected PSW system mask.

In step 236 the interrupt/completion control 124 initiates a pipeline interrupt. The pipeline interrupt causes all instructions which have not yet completed (i.e., all instructions subsequent to the STOSM) to be discarded. This prevents any subsequent instructions from being completed before the completion/interrupt control 124 has seen the newly enabled asynchronous interrupt.

In step 238 the completion/interrupt control 124 initiates the asynchronous interrupt, providing that the asynchronous interrupt is still pending.

Note that if the STOSM instruction does not complete (as determined by the completion/interrupt control 124), then the SXE 108 discards the new system mask value in the system mask queue 102. Also, all instructions which began execution after the STOSM instruction, and which used the new PSW system mask value generated by the STOSM instruction, are also discarded.

4.0. ACE

The manner in which the present invention processes SPKA and SAC instructions with overlap enabled is described in the following sections.

4.1. SPKA

According to the present invention, the SPKA instruction is modified in three ways. Such modifications enable the SPKA instruction to be executed with overlap enabled.

First, the SPKA instruction is defined as a serialization instruction, although this is not explicitly required by the ESA/390 architecture.

Second, the I-cache control 162 is modified such that, coincident with the processing of a SPKA instruction, the I-cache control 162 detects prefetched instructions (that is, instructions which were fetched before the execution of the SPKA instruction, but which logically execute after the SPKA instruction) which are fetch protected. Such prefetched instructions may be invalid since their associated protection bits may not be equal to the new PSW access key set by the SPKA instruction.

Third, the I-cache control 162 invokes a pipeline reset mechanism which discards, refetches, redecodes, and reexecutes any prefetched instructions which are fetch protected. Such refetching is performed using the new PSW access key. Note that any mechanism which performs the functions of the pipeline reset mechanism, as described above, may be used to achieve the present invention. For an example of a pipeline reset mechanism, see FIGS. 4 and 8, and accompanying discussion, and pages 16 and 17 in pending patent application entitled "Overlapped Serialization," which was earlier incorporated by reference herein.

Figure 3:
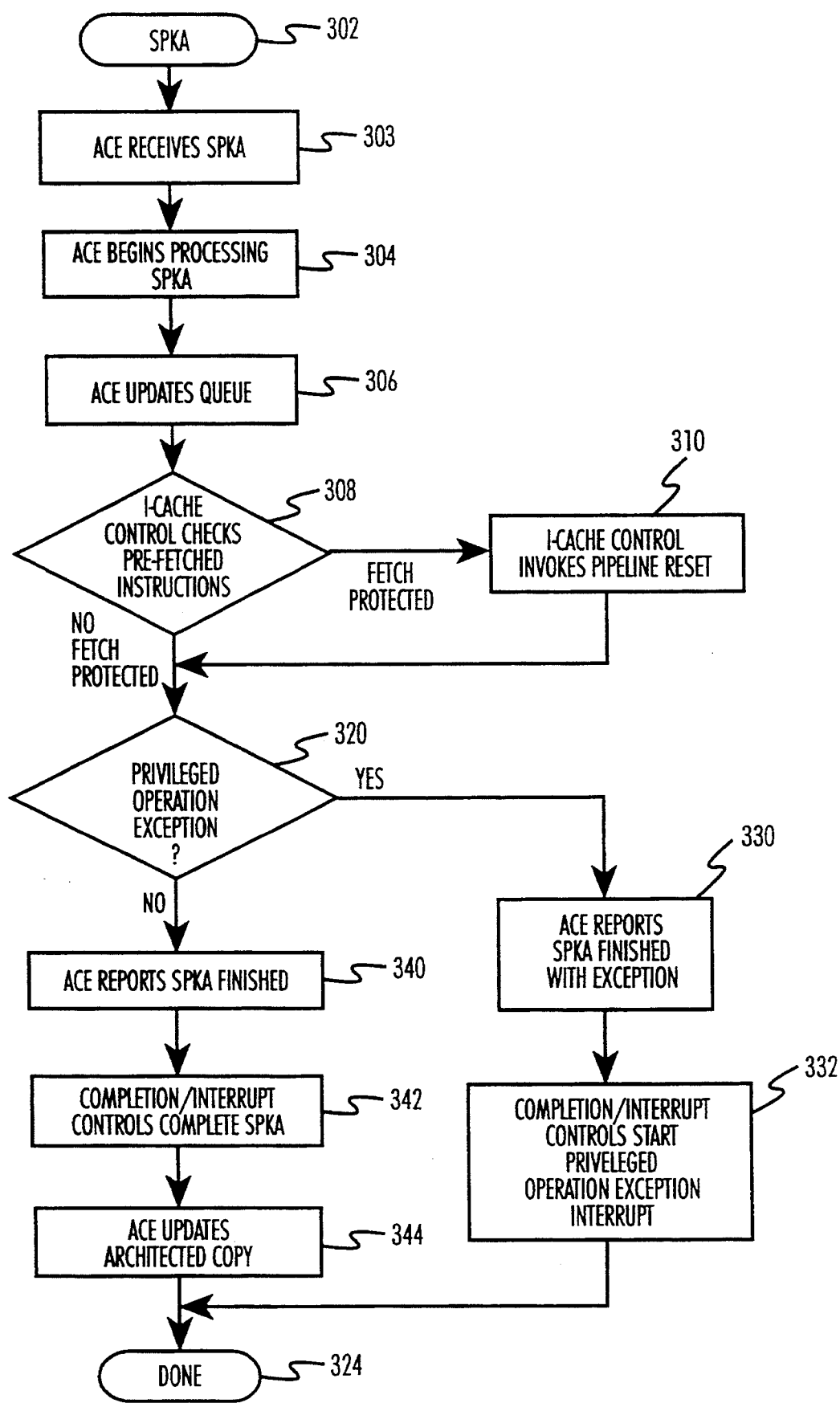
FIG. 3 illustrates the manner in which the present invention processes the SPKA instruction with overlap enabled.

These modifications of the SPKA instruction are further described below with reference to FIG. 3. FIG. 3 illustrates the manner in which the present invention processes the SPKA instruction with overlap enabled.

In step 303, the ACE 114 receives a SPKA instruction from the I-decode 128 (via the instruction queue 166A).

In step 304, the ACE 114 begins to process the SPKA instruction. During step 304, the ACE 114 generates a new PSW access key value. The manner in which the ACE 114 generates the new PSW access key value is well known.

In step 306, the ACE 114 associates the new PSW access key value with an instruction identification (IID) of the SPKA instruction. Then, the ACE 114 pushes the new PSW access key value and the IID into the top of the key/address space queue 104.

In step 308, the I-cache control 162 determines whether prefetched instructions with fetch protection exist.

If prefetched instructions with fetch protection do not exist, then in step 320 the ACE 114 determines whether a privileged operation exception exists, as defined in the ESA/390 architecture. The method for determining this is well known in the art.

If a privileged operation exception exists, then in step 330 the ACE 114 reports the SPKA as finished with that exception.

In step 332 the finished report from the ACE 114 is monitored by the completion/interrupt control 124. When the SPKA is finished and all prior instructions have been completed, the completion/interrupt control 124 initiates the program interrupt for the privileged operation exception. Note that since the SPKA does not complete in this case, the new PSW access key value never becomes the architected PSW access key.

If a privileged operation exception does not exist, then in step 340 the ACE 114 reports the SPKA as finished.

In step 342 the finished report from the ACE 114 is monitored by the completion/interrupt control 124. When the SPKA is finished and all prior instructions have been completed, the completion/interrupt control 124 reports the SPKA completed.

In step 344, the completion report from the completion/interrupt control 124 is monitored by the ACE 114. When the SPKA is completed, the ACE 114 updates the PSW address register 122 with the new PSW access key from the address queue 104. Thus, the new PSW access key value becomes the architected PSW access key.

If prefetched instructions with fetch protection do exist, then in step 310 the I-cache control 162 invokes the pipeline reset mechanism as described above. Then, step 320 is performed as described above.

Note that, if the SPKA instruction does not complete, then the ACE 114 discards the new PSW access key in the key/address space queue 104. Also, all instructions which began execution after the SPKA instruction, and which used the new PSW access key generated by the SPKA instruction, are also discarded, and instruction fetching resumes using the appropriate access key.

4.2. SAC

According to the present invention, the SAC instruction is modified in the following way. This modification enables the SAC instruction to be executed with overlap enabled.

The modification is as follows. The I-cache control 162 is modified such that, coincident with the processing of a SAC instruction, the I-cache control 162 determines whether the SAC instruction changes the PSW address space code such that instructions are fetched from a different space in memory. Specifically, the I-cache control 162 determines whether the SAC instruction changes the PSW address space from home mode (which accesses instructions from home space) to either primary, secondary, or access register mode (which accesses instructions from primary space), or vice versa.

If the SAC instruction does change the PSW address space code from home mode to any of the other modes, or vice versa, then the I-cache control 162 invokes the pipeline reset mechanism. As described above, the pipeline reset mechanism discards, refetches, redecodes, and reexecutes any prefetched instructions since such prefetched instructions may have been fetched from the wrong memory space. Such refetching is performed using the new PSW address space code set by the SAC instruction.

Figure 4:
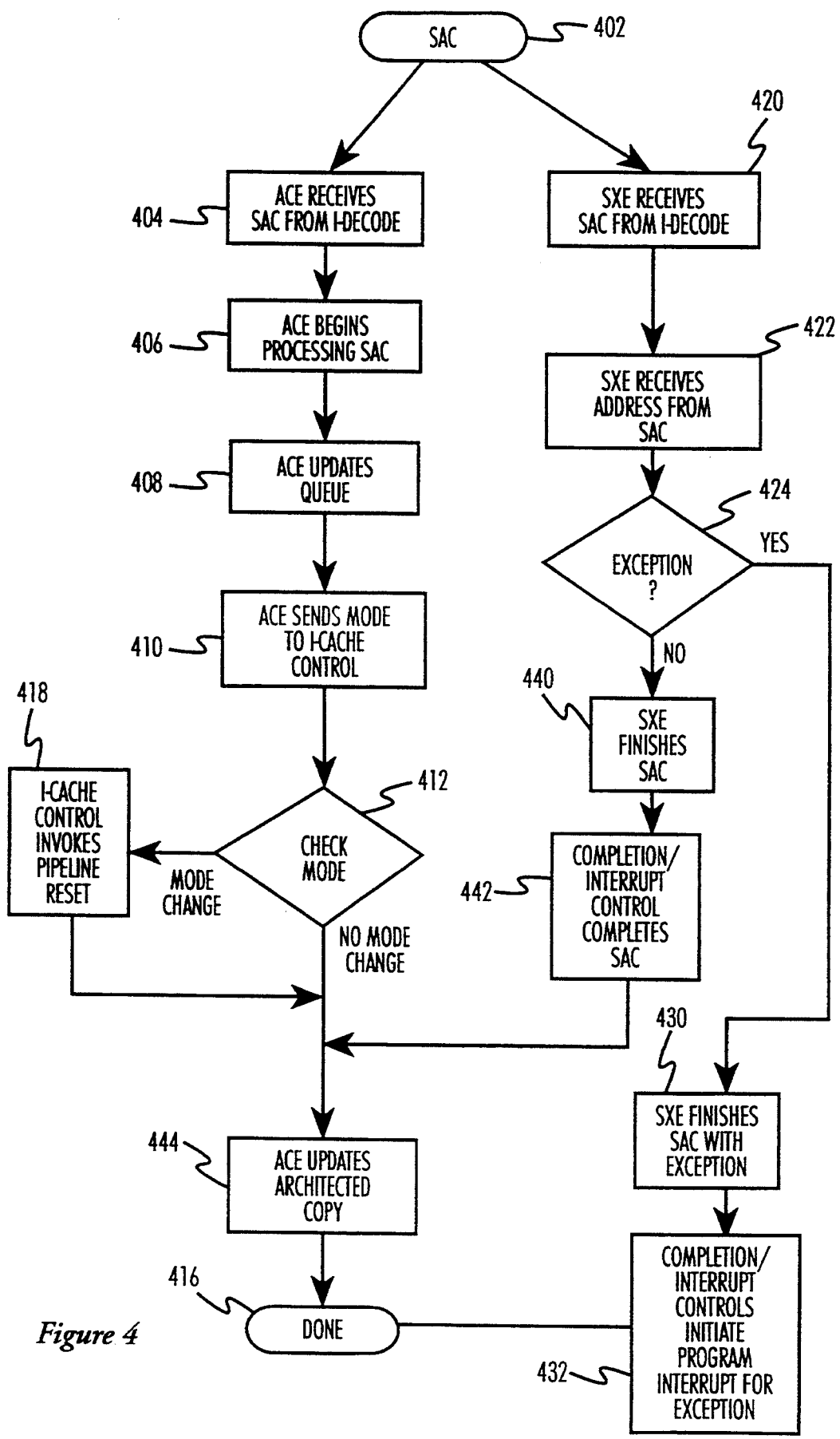
FIG. 4 illustrates the manner in which the present invention processes the SAC instruction with overlap enabled.

This modification of the SAC instruction is further described below with reference to FIG. 4. FIG. 4 illustrates the manner in which the present invention processes the SAC instruction with overlap enabled.

In step 404, the ACE 114 receives a SAC instruction from the I-decode 128 (via the instruction queue 166A).

In step 406, the ACE 114 begins to process the SAC instruction. During step 406, the ACE 114 generates a new PSW address space code value. The manner in which the ACE 114 generates the new PSW address space code value is well known.

In step 408, the ACE 114 associates the new PSW address space code value with an instruction identification (IID) of the SAC instruction. Then, the ACE 114 pushes the new PSW address space code value and the IID into the top of the key/address space queue 104.

In step 410, the ACE 114 sends an indication of the new PSW address space code value to the I-cache control 162. In the preferred embodiment of the present invention, the indication is either "home," if the new PSW address space code indicates the home mode, or "not home," if the new PSW address space code indicates either primary, secondary, or access register mode.

In step 412, the I-cache control 162 determines whether the address space from which instructions are fetched has changed due to the SAC instruction. That is, whether the memory space from which instructions are fetched has changed from the home space to the primary space, or vice versa.

If the address space has changed, then in step 418 the I-cache control 162 invokes the pipeline reset mechanism as described above. Then, step 444 is performed as described below.

As shown in FIG. 4, in step 420 the SXE 108 also receives the SAC instruction from the I-decode 128 (via the instruction queue 166D).

In step 422, the SXE 108 receives the new PSW address space code value which the ACE 114 generated in step 406.

In step 424, the SXE 108 uses the new PSW address space code value to determine whether the SAC instruction created a program exception condition (privileged operation, special operation, or specification exception) as defined by the ESA/390 architecture.

If the SXE 108 does not detect an exception, then in step 440 the SXE reports the SAC as finished.

In step 442 the finished report from the SXE 108 is monitored by the completion/interrupt control 124. When the SAC is finished and all prior instructions have been completed, the completion/interrupt control 124 reports the SAC completed.

In step 444 the completion report from the completion/interrupt control 124 is monitored by the ACE 114. When the SAC is completed, the ACE 114 updates the PSW address register 122 with the new PSW address space code from the address queue 104. Thus, the new PSW address space code value becomes the architected PSW address space code.

If the SXE 108 detects an exception, then in step 430 the SXE 108 reports the SAC as finished with a terminating exception.

In step 432 the finished report from the SXE 108 is monitored by the completion/interrupt control 124. When the SAC is finished and all prior instructions have been completed, the completion/interrupt control 124 initiates the terminating program interrupt. Note that since the SAC does not complete in this case, the new PSW address space code value never becomes the architected PSW address space code.

If the SAC instruction does not complete, either due to an interrupt, an incorrect branch prediction, or a terminating program exception, then the ACE 114 discards the new PSW address space code in the key/address space queue 104. Also, all instructions which began execution after the SAC instruction, and which used the new PSW address space code generated by the SAC instruction, are discarded, and instruction fetching resumes using the appropriate address space code.

While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. In a computer system having at least one processor configured to overlap the processing of a plurality of instructions, including a program status word having a system mask, access key, and address space code, a subsystem in the at least one processor for modifying a program status word with overlap instruction processing enabled, the subsystem comprising:

decoder means for detecting a program status word modification instruction, wherein said program status word modification instruction is configured to modify an existing program status word;

execution means, coupled to said decoder means, for executing said detected program status word modification instruction with overlap instruction processing enabled, said execution means comprising:

an execution unit configured to execute said program status word modification instruction to generate a new program status word, queue means, coupled to said execution unit, for storing an unarchitected program status word, said unarchitected program status word being said new program status word generated by said execution unit, register means, coupled to said execution unit and to said queue means, for storing an architected program status word, said architected program status word being said existing program status word in he subsystem, first transfer means, coupled to said execution unit and to said queue means, for transferring said unarchitected program status word from said execution unit into said queue means, second transfer means, coupled to said queue means and to said register means, for transferring said unarchitected program status word from said queue means to said register means in response to said execution unit completely executing said program status word modification instruction, and discard means, for discarding said unarchitected program status word from said queue means in response to said execution unit incompletely executing said program status word modification instruction; and completion detection means, coupled to said decoder means and said execution means, for determining when said execution of said program status word modification instruction is completed, wherein said second transfer means transfers said unarchitected program status code from said queue means to said register means in response to said completion detection means determining said execution unit has completed said execution of said program status word modification instruction.

2. The subsystem of claim 1, further comprising: interrupt control means, coupled to said decoder means and said execution means, for processing interrupts.

3. The subsystem of claim 2, wherein said execution means further comprises:

mask generation means for generating an interrupt mask according to said program status word modification instruction being processed, wherein said new program status word generated by said execution unit comprises said interrupt mask;

detection means, coupled to said mask generation means, for determining whether said interrupt mask enables a pending asynchronous interrupt;

second discard means, coupled to said interrupt control means and said second detection means, for discarding all pending instructions which logically execute after said program status word modification instruction being processed by said execution unit when said second detection means determines that said interrupt mask enables said pending asynchronous interrupt; and initiation means, coupled to said interrupt control means and said second discard means, for initiating said pending asynchronous interrupt according to said architected program status word after said second discard means discards all of said pending instructions.

4. The subsystem of claim 1, further comprising:

instruction cache control means, coupled to said decoder means and said execution unit, for determining whether prefetched instructions are fetch protected, said prefetched instructions being instructions which were fetched from a memory storage location before said execution of said program status word modification instruction and which logically execute after said program status word modification instruction.

5. The subsystem of claim 4, wherein said execution means further comprises:

access key generation means, coupled to said instruction cache control means and to said decoder means, for generating an access key according to said program status word modification instruction detected by said decoder means and executed by said execution unit, wherein said new program status word comprises said access key; and invocation means, coupled to said instruction cache means, for resetting each of said prefetched instructions which are fetch protected.

6. The subsystem of claim 5, wherein said invocation means comprises:

third discard means, coupled to said invocation means, for discarding all of said prefetched instruction which are fetch protected; and fetch means, coupled to said revocation means and to said third discard means, for refetching said prefetched instruction which are fetch protected according to said access key.

7. The subsystem of claim 1, further comprising:

instruction cache control means, coupled to said decoder means and said execution unit, for determining whether the contents of said memory storage locations have changed.

8. The subsystem of claim 7, wherein said execution means further comprises:

address space code generation means, coupled to said instruction cache means and said decoder means, for generating an address space code according to said program status word modification instruction detected by said decoder means and executed by said execution unit, wherein said new program status word comprises said address space code; and invocation means, coupled to said instruction cache control means, for resetting said memory storage locations which are designated by said instruction cache control means as having contents which have changed.

9. The subsystem of claim 8, wherein said invocation means comprises:

third discard means, coupled to said instruction cache control means, for discarding all pending instructions which logically executed after said execution unit completes said execution of said program status word modification instruction; and refetch means, coupled to said invocation means and to said third discard means, for refetching said pending instructions according to said address space code.

10. The subsystem of claim 8, wherein said execution means further comprises:

exception determination means, coupled to said execution unit, for determining whether said program status word modification instruction being processed by said execution unit caused an exception; and termination means, coupled to said exception determination means, for terminating said program status word modification instruction being processed by said execution unit when said exception occurs.

11. The subsystem of claim 1, further comprising:

second discard means, coupled to said execution means, for discarding subsequent instructions which depend upon said new program status word if said program status word modification instruction being processed by said execution means does not complete.

12. A computer system comprising at least one processor, each of said at least one processor comprising:

(1) a program status word comprising interrupt masks, an access key, and an address space code;

(2) decoder means for detecting program status word modification instructions wherein each of said program status word modification instructions is configured to modify an existing program status word;

(3) execution means, configured to process a plurality of instructions simultaneously, coupled to said decoder means and responsive to said detected program status word modification instruction, for processing said program status word modification instructions with overlap instruction processing enabled to thereby generate a new program status word, said execution means comprising:

register means, coupled to said decoder means, for storing an architected program status word, said architected program status word being said existing program status word in the subsystem, queue means for storing unarchitected program status words, said unarchitected program status words being new program status words generated by said execution unit, first transfer means, coupled to said queue means, for transferring said unarchitected program status word into said queue means, second transfer means, coupled to a completion means, said register means, and said queue means, for transferring said new program status word from said queue means to said register means in response to completion of said program status word modification instruction processing, and discard means, coupled to said completion means, for discarding said new program status word from said queue means in response to incomplete processing of said program status word modification instruction; and (4) said completion detection means, coupled to said execution means, for determining when said execution of said program status word modification instructions has completed, wherein said execution means processes each of said program status word modification instructions according to said unarchitected program status words.

13. The computer system of claim 12, wherein each of said at least one processor further comprise:
   means for discarding subsequent instructions which depend upon said new program status word in response to incomplete processing of said program status word modification instruction.

14. In a computer system comprising at least one processor configured to overlap the processing of a plurality of instructions, the at least one processor having a program status word having a system mask, access key, and address space code, each of the at least one processor having a decoder, an execution unit coupled to the decoder, a queue coupled to the execution unit, and an architected register coupled to the execution unit and queue, a method for modifying the program status word with overlap instruction processing enabled comprising the steps of:
   (a) receiving a program status word modification instruction by the decoder;
   (b) processing said program status word modification instruction with overlap instruction processing enabled by the execution unit according to an unarchitected program status word contained in the queue, wherein said program status word modification instruction being processed generates a new program status word;
   (c) transferring said new program status word into the queue by a first transfer means coupled to the execution unit and the queue;
   (d) determining, by a completion detection unit coupled to the execution unit, whether said execution unit completely processes said program status word modification instruction;
   (e) transferring said new program status word from the queue to the architected register by a second transfer means coupled to the queue and the architected register in response to said execution unit completely processing said program status word modification instruction wherein the architected register stores an architected program status word, said architected program status word being said existing program status word in the at least one processor; and
   (f) discarding, by the execution unit, said new program status word from the queue in response to incomplete processing of said program status word modification instruction.

15. The method of claim 14, wherein said processing step comprises the step of:
   1) generating an interrupt mask according to said program status word modification instruction being processed, wherein said new program status word comprises said interrupt mask.

16. The method of claim 15, further comprising the steps of:
   (g) determining whether said interrupt mask enables a pending synchronous interrupt;
   (h) discarding, in response to said interrupt mask enabling said pending synchronous interrupt, all pending instructions which logically execute after said program status word modification instruction; and
   (i) initiating said pending synchronous interrupt according to said architected program status word after said step for discarding all pending instructions completes.

17. The method of claim 14, wherein said processing step comprises the steps of:
   1) generating an access key according to said program status word modification instruction being processed, wherein said new program status word comprises said access key;
   2) determining whether prefetched instructions are fetch protected, said prefetched instructions being instructions which were fetched from a memory storage location of the at least one processor before said execution of said program status word modification instruction and which logically executed after said program status word modification instruction; and
   3) resetting each of said prefetched instructions which are fetch protected.

18. The method of claim 17, wherein said resetting step comprises the steps of:
   i) discarding all of said prefetched instructions which are fetch protected; and
   ii) refetching said prefetched instructions which are fetch protected according to said access key.

19. The method of claim 14, wherein said processing step comprises the steps of:
   1) generating an address space code according to said instruction being processed, wherein said new program status word comprises said address space code;
   2) determining whether a memory space of the computer system has changed; and
   3) resetting said memory space when said memory space has changed.

20. The method of claim 19, wherein said resetting step comprises the steps of:
   i) discarding all pending instructions which logically execute after said instruction being processed; and
   ii) refetching said pending instructions according to said address space code.

21. The method of claim 14, further comprising the step of:
   g) discarding subsequent instructions which depend upon said new program status word in response to incomplete processing of said program status word modification instruction.

* * * * *